United States Patent [19]

Breher

[11] Patent Number: 4,563,323
[45] Date of Patent: Jan. 7, 1986

[54] METHOD AND APPARATUS FOR THE MANUFACTURE OF A CONTINUOUS SERRATED BELT

[75] Inventor: Rüdolf Breher, Porta Westfalica, Fed. Rep. of Germany

[73] Assignee: BRECO Kunststoffverarbeitungs-GmbH & Co. KG, Porta Westfalica, Fed. Rep. of Germany

[21] Appl. No.: 560,013

[22] Filed: Dec. 9, 1983

[30] Foreign Application Priority Data

Dec. 28, 1982 [DE] Fed. Rep. of Germany ....... 3248264

[51] Int. Cl.$^4$ .............................................. B29B 45/03
[52] U.S. Cl. ................................ 264/279.1; 156/140; 264/328.1; 264/328.8; 264/328.11; 425/28 B; 425/115; 425/371
[58] Field of Search .................. 425/28 B, 34 B, 373, 425/371, 115, 114, 113; 264/328.8, 328.11, 328.3, 328.1, 326, 279.1, 275, 229, 231, 279; 156/140, 137, 138

[56] References Cited

U.S. PATENT DOCUMENTS

| | | | |
|---|---|---|---|
| 3,353,419 | 11/1967 | Richmond | 156/140 |
| 3,839,116 | 10/1974 | Thomas et al. | 156/138 |
| 3,999,914 | 12/1976 | Breher et al. | 425/114 |
| 4,058,424 | 11/1977 | Breher | 156/137 |
| 4,174,367 | 11/1979 | Breher | 264/261 |
| 4,268,471 | 3/1981 | Breher | 264/229 |
| 4,309,375 | 1/1982 | Rabenecker | 425/34 B |

Primary Examiner—Michael Ball
Attorney, Agent, or Firm—Jordan and Hamburg

[57] ABSTRACT

An annular channel on the circumference of a rotatable moulding wheel is closed with a part-circular covering to form a mould cavity at the commencement of which mouldable material is introduced with an injection nozzle. For the production of reinforced toothed belts with a circumference larger by any desired amount than the moulding wheel circumference, a moulding ring consists of a flexible band, the diameter of which is larger than the moulding wheel diameter. The moulding ring is formed with toothing and a force-transmission element coil is wound on the exterior and has its ends fixed on the moulding ring. The moulding ring is inserted between a moulding wheel and covering into the moulding wheel channel and after the laying of the covering upon the moulding wheel and application of the injection nozzle to the mould cavity, the mouldable material is introduced between the covering and moulding ring until the beginning part of the reinforced moulding material continuous length issuing from the mould cavity on the moulding ring is fused together with the end part of the continuous length on reintroduction into the mould cavity of the beginning part. Then the moulding ring with the endless toothed belt is removed from the moulding wheel and separated from the finished endless reinforced toothed belt.

15 Claims, 9 Drawing Figures 4,563,323

METHOD AND APPARATUS FOR THE MANUFACTURE OF A CONTINUOUS SERRATED BELT

BACKGROUND OF THE INVENTION

This invention relates to a method for producing an endless reinforced toothed belt from synthetic plastic material or the like with embedded force-transmission elements of wire or thread form extending in the longitudinal direction of the belt. A mould cavity is formed between a rotatable moulding wheel having an annular channel upon its circumference corresponding to the belt cross-section and a covering closes the channel over a part of the circumference of the moulding wheel. The plasticized synthetic plastic material is introduced into the beginning of the mould cavity which is closable by an injection nozzle. The invention further relates to an apparatus for carrying out the above-mentioned method.

With the apparatus and method according to Federal Republic of Germany Pat. No. 2,123,902 which utilizes a rotatable moulding wheel and as covering an endless moulding band advancing with the moulding wheel, a reinforced toothed belt can be produced which, however, is finite and must be made endless for use as a circulating drive element between toothed wheels so that the toothed belt has an interruption of its embedded force-transmission elements at the point of the circumference where the endless connection takes place. With the method and apparatus known for example from Federal Republic of Germany Pat. No. 2,526,691 which, in addition to a moulding wheel and moulding band uses an axially parallel tensioner wheel remote from the moulding wheel, an endless reinforced toothed belt can be produced, the desired circumferential length of which can be varied by variation of the axial distance between moulding wheel wheel and tensioner wheel. However, the minimum circumferential length which can be produced, which is dependent upon the diameter of the moulding wheel and of the tensioner wheel, is limited by the minimum possible axial distance down to which the tensioner wheel can approach the moulding wheel. Below this minimum circumferential length in fact it is possible to produce endless reinforced toothed belts with what is called tool-confined belt circumferential length in a moulding tool known, for example, from Federal Republic of Germany Pat. No. 2,653,741 and consisting of a mould core and a moulding sleeve. However, for every belt size to be produced, a separate extension moulding tool, to be manufactured complete from mould core and moulding sleeve, is necessary.

The invention has faced the problem of further developing a production method of the initially stated classification in such a way that endless reinforced toothed belts can be produced, the belt circumferential length of which is smaller than the minimum circumferential length which can be produced with a method after the style of Federal Republic of Germany Pat. No. 2,526,691, and can be varied to be as much greater as desired as from a ring size corresponding substantially to the circumference of the utilized moulding wheel.

SUMMARY OF THE INVENTION

The method according to the invention solves this problem in that a flexible moulding ring of strip form which can be pushed axially on to the moulding wheel is wound on its moulding ring exterior, containing the toothing, in helical form with a coil of force-transmission element and the ends of the coil are fixed to the moulding ring in that then the moulding ring is inserted between moulding wheel and covering into the moulding wheel depression, whereafter the moulding wheel depression is closed by placing of the covering upon the moulding wheel and the mould cavity commencement is closed by application of the injection nozzle to the covering and to the exterior of the moulding ring, in that thereafter the synthetic plastic material is introduced between covering and moulding ring into the mould cavity and the moulding ring is rotated by one revolution on the moulding wheel, which accompanies the rotation, until the circumferential section of the moulding ring carrying the commencement of the formed reinforced synthetic plastic continuous length enters the mould cavity commencement again and the beginning of the continuous length is connected with the end of the continuous length by introduced synthetic plastic material, and then the moulding ring with the formed endless toothed belt is taken from the moulding wheel and the toothed belt is separated from the moulding ring.

The method in accordance with the invention will be explained in greater detail below by reference to the drawings, in which examples of embodiments of apparatus for carrying out the method is illustrated. In accordance with the invention, a moulding wheel consists of a middle part with an untoothed, flat circumferential surface and two lateral flanges of larger diameter. Upon the middle part there is disposed a moulding ring provided on its exterior with a toothing of toothed-belt form, fitting between the two flanges, which moulding ring consists of a band of a flexible material, its diameter being larger than the diameter of the flanges. The beginning of the mould cavity formable between the molding wheel and the covering placeable upon the flanges is closable by an injection nozzle which cooperates in a sealing manner with the toothed exterior of the moulding ring, wound with a coil of force-transmission element, and with the covering and the flanges.

DESCRIPTION OF THE PREFERRED EMBODIMENTS

Figure 4:
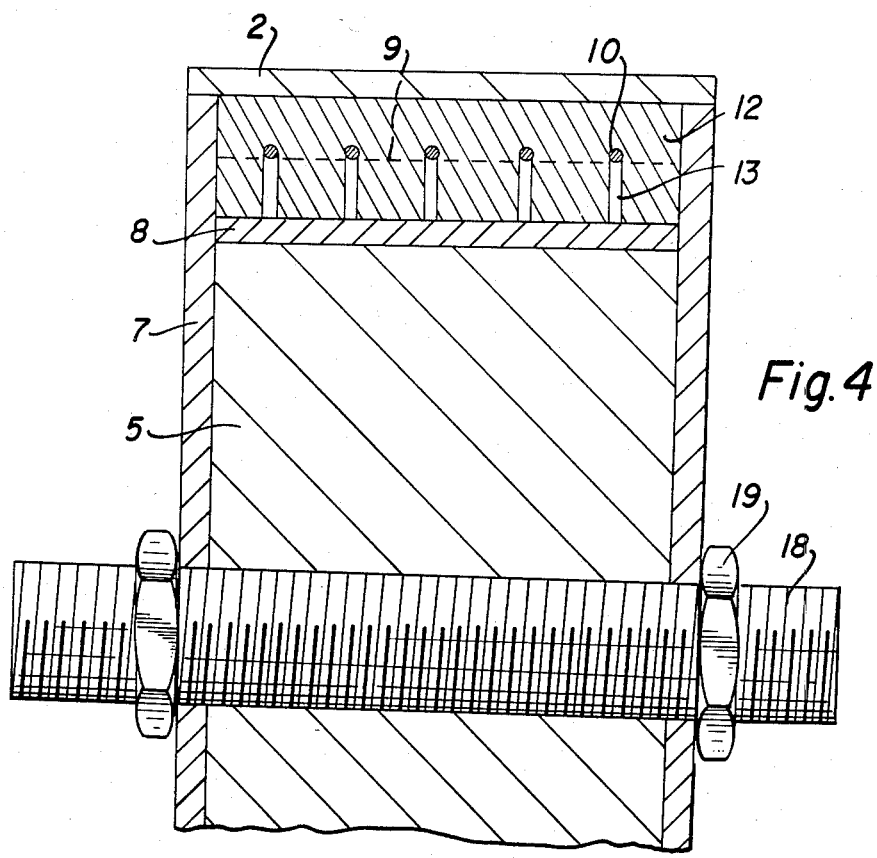
FIG. 4 is a partial diametrical section view of the moulding wheel.

The apparatus consists of a rotatable moulding wheel 1 which comprises on its circumference an annular depression corresponding to the cross-section of the belt, of an endless moulding band 2 which runs around rollers 3 and forms a covering to close the moulding wheel depression on a part of the circumference of the moulding wheel, and of an extruder nozzle 4 with which the commencement of the mould cavity of arcuate form formable between moulding wheel 1 and moulding band 2 is closable and through which the plasticized synthetic plastic material is introduced into the commencement of the mould cavity. The moulding wheel 1 consists of a middle part 5 with untoothed, flat circumferential surface 6 and of two lateral flanges 7 the diameter of which, in dependence upon the cross-section of the toothed belt to be produced, is larger than the diameter of the middle part 5 and upon the circumference of which the moulding band 2 is laid in sealing manner when the moulding band 2 is brought to the moulding wheel 1 to form the closed mould cavity. To produce the toothed profile of the toothed belt, an endless moulding ring 8 which can be pushed axially on to the moulding wheel 1 is laid upon the middle part 5, its diameter being larger by as much as desired than the diameter of the middle part 5, according to the desired circumferential length of the toothed belt to be produced, taking consideration of the tooth pitch. The width of the moulding ring 8 can also be varied, for which purpose the moulding wheel 1 is advantageously made to be dismantled so that the flanges 7 can be used further and a middle part 5 with suitable width can be arranged between them. FIG. 4 shows a threaded shaft 18 of the moulding wheel and nut elements 19 threaded on the shaft 18 for securing the flanges 7 in place. The moulding ring 8 possesses on its exterior a toothing consisting of teeth 9 and tooth gaps 11 corresponding to the tooth form and tooth pitch of the toothed belt to be produced. The moulding ring 8 consists of a band of a flexible material, for example of steel or another metal or a reinforced synthetic plastic material, which does not enter into any bond with the synthetic plastic material to be utilized for the belt to be produced. The moulding ring when made of such material, for example steel, is flexible as regards bending but is substantially elastically non-stretchable in a longitudinal direction.

Figure 2:
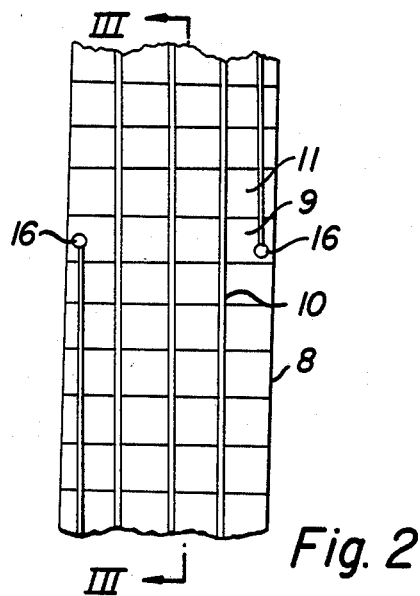
FIG. 2 is a partial plan view, on a larger scale, looking in the direction of the arrow II in FIG. 3 and showing the helical coil.
Figure 3:
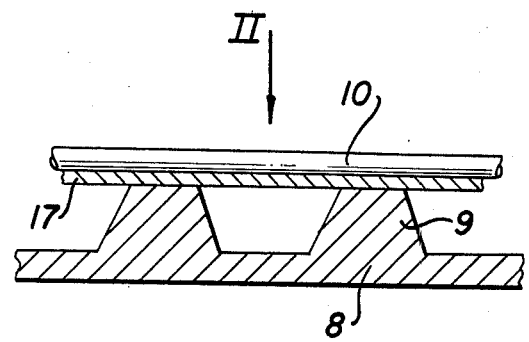
FIG. 3 is a partial elevational view showing a longitudinal section taken along the lines III—III in FIG. 2.

Before the moulding ring 8 is laid upon the moulding wheel 1, it is wound on its exterior in helical form with a coil 10 of force-transmission element of wire or thread form to be embedded into the belt to be produced, the ends of which coil are fixed to the moulding ring 8, for example by clamping or other retention in securing positions on the lateral edges of the moulding ring 8. FIG. 2 shows an example of the ends 16 of the coil 10 secured to the moulding ring. The force-transmission element coil 10 is supported by the moulding ring teeth 9 at a distance from the part of strip form of the moulding ring 8, so that the force-transmission element coil 10 is embedded in the synthetic plastic body of the toothed belt to be produced, for example in its neutral flexure zone. Before the force-transmission element coil 10 is wound on, it is also possible for a fabric strip elastically stretchable in its longitudinal direction to be laid upon the moulding ring teeth 9, if it is inteded to produce a toothed belt having a fabric layer covering the toothed belt side, which layer in the mould cavity is pressed down by the synthetic plastic material introduced under pressure into the tooth gaps 11 of the moulding ring 8, the fabric strip being elastically stretched. FIG. 3 shows an example of such a fabric strip 17.

Figure 5:
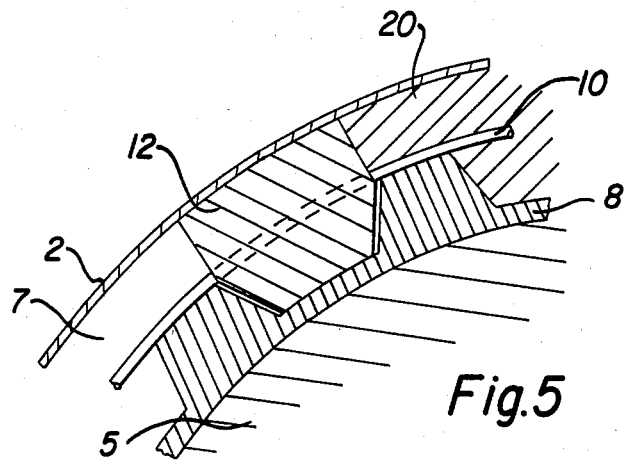
FIG. 5 is a partial sectional view showing how the lock provides the seal between the covering and the moulding ring.

After the winding on of the force-transmission element coil 10, a lock 12 is inserted into a tooth gap 11 of the moulding ring 8, the height of the lock corresponding to the toothed belt profile so that the lock protrudes from the tooth gap 11 of the moulding ring 8 by the thickness of the belt back of the toothed belt to be produced. The lock 12 is provided, on its radially inner side, with recesses 13 of slot form so that the lock 12 can be set from the exterior upon the turns of the force-transmission element coil 10 and inserted into the tooth gap 11, and equally can be lifted outwards from the moulding ring 8 again. FIG. 4 shows the lock 12 and how it is provided with recesses 13 so that it can be set from the exterior onto the turns of the coil of wire 10 and inserted into a tooth gap 11 between the teeth of the moulding ring 8. FIG. 5 shows how the lock 12 provides a seal between the moulding band 2 and the moulding ring 8, separating the mould cavity from the mould cavity end so that the synthetic material, designated by 20, introduced into the mould cavity, can only flow forward to the lock 12 and can thus be introduced into the mould cavity while building injection pressure.

The moulding ring 8 carrying the force-transmission element coil 10 is laid upon the moulding wheel 1 in such a way that the lock 12 is situated at the beginning of the mould cavity. Then the mould cavity is closed by bringing the moulding band 2 to the moulding wheel 1. The extruder nozzle 4 is brought in to close the mould cavity commencement and cooperates on its outer side in sealing manner with the moulding band 2 and on its inner side in sealing manner with at least two teeth 9 of the moulding ring 8 which slide simultaneously along on it. For this purpose, for example, the moulding ring teeth 9 can comprise on their tip surface narrow winding noses of web form (not shown) which on the one hand with winding nose notches fix the turns of the force-transmission element coil at the predetermined turn intervals and on the other hand in being conducted past the inner side of the extruder nozzle 4 block the intervals between the turns of the force-transmission element coil in sufficiently sealing manner.

After the closing of the mould cavity, the synthetic plastic material 20 is introduced through the extruder nozzle 4, between its mouth and the lock 12. The lock 12, cooperating in sealing manner with the moulding band 2, blocks the mould cavity from the mould cavity end, so that on introduction of the synthetic plastic material, the necessary injection pressure can be built up. Under the pressure of the introduced synthetic plastic material and simultaneous circulation of the moulding band 2, the moulding ring 8 rotates on the moulding wheel 1, which accompanies the rotation. As soon as the beginning of the formed reinforced and consolidated synthetic plastic of continuous length emerges from the end of the mould cavity and takes over the further closure of the mould cavity end, the lock 12 is withdrawn radially outwards from the moulding ring 8 and the force-transmission element coil 10.

Figure 6:
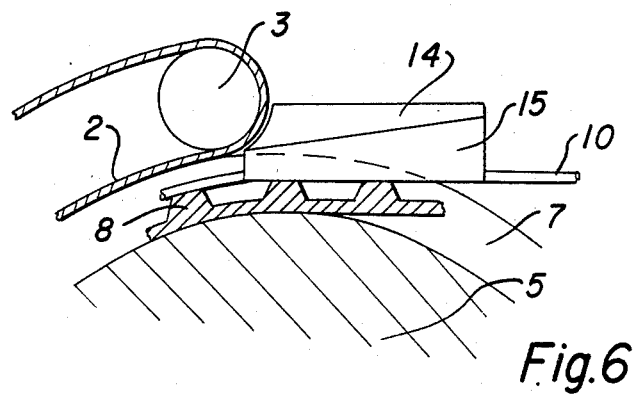
FIG. 6 is a partial sectional view showing the two nozzle parts in one position during the moulding operation.
Figure 7:
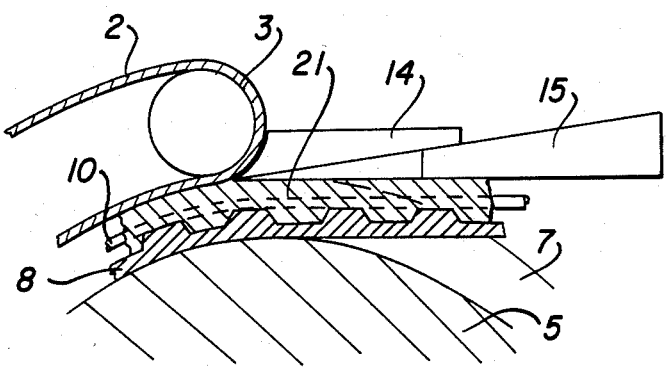
FIG. 7 is a partial sectional view, similar to FIG. 6, but showing one of the nozzle parts in a different position.

The moulding ring 8 is rotated further for a total of one revolution until the beginning of the synthetic plastic continuous length arrives at the mould cavity commencement and the extruder nozzle 4 again and is connected with the end of the continuous length after reintroduction into the mould cavity. For this purpose, the extruder nozzle 4 advantageously consists of a stationary nozzle part 14 cooperating with the moulding band 2 and a retractable nozzle part 15 cooperating with the moulding ring 8. The nozzle part 15 closes that cross-sectional part of the mould cavity commencement which corresponds to the cross-section of the back of the toothed belt to be produced. When the beginning of the continuous synthetic plastic length arrives at the extruder nozzle 4, the retractable nozzle part 15 is retracted from the FIG. 6 to the FIG. 7 position so far that is clears the cross-sectional part of the mould cavity commencement corresponding to the cross-section of the back of the belt, and the beginning of the continuous length is reintroduced into the mould cavity. During the remainder of the in-feed of synthetic plastic material, the back surface of the beginning of the continuous length slides in a sealing manner along the retracted nozzle part 15. FIG. 6 shows how the nozzle part 14 sealingly engages the radial exterior of the passing-by moulding band 2 and how the retractable nozzle part 15, which allows the coil of wire to enter the mould cavity between it and the moulding ring 8, cooperates radially in an interior direction with at least two sliding teeth of the moulding ring so that a tooth gap of the moulding ring 8 does not create a connection of the mould cavity beginning in an exterior, backward direction, through which the synthetic material introduced into the mould cavity might otherwise pass in a backward direction. The synthetic toothed belt produced in the mould cavity and exiting from the mould cavity end is returned to the mould cavity during a turn of the moulding ring 8 with the beginning of the belt being reintroduced into the mould cavity beginning for connection with the belt end. In FIG. 7, the numeral 21 indicates the beginning of the toothed belt re-entering the mould cavity. FIG. 7 also shows how the nozzle part 14 remains in contact with the moulding band 2 in a sealing manner and how the withdrawn nozzle part 15 sealingly engages the outer periphery of the toothed belt, the withdrawal of the nozzle part 15 permitting the beginning 21 of the formed toothed belt to be reintroduced into the mould cavity.

After the bringing-together and connection of the beginning and end of the continuous length, the moulding ring 8 with the formed endless toothed belt is removed from the moulding wheel 1 and the toothed belt is separated from the moulding ring for reuse for the production of the next toothed belt. Due to the elastic flexibility of the moulding ring 8 of band form, the finished toothed belt does not have to be separated from the moulding ring 8 by difficult stripping off axially, but rather the moulding ring 8 can be pressed inwards radially at a circumferential point and lifted away from the toothed belt, so that the effective diameter of the moulding ring 8 is reduced in comparison with the diameter of the toothed belt and the moulding ring 8 can be taken out of the toothed belt without difficulty.

After the bringing-together of the beginning and end of the continuous length in the commencement of the mould cavity, the continuous length commencement must be fused again by the action of temperature so that it can be fused together satisfactorily with the end of the continuous length. This requires a certain halting time of the apparatus. Immediately after the reintroduction of the beginning of the continuous length and its bringing-together with the end of the continuous length, the moulding ring with toothed belt can advantageously be taken out of the apparatus and laid into a short mould plate, for example half-round, in order to weld the end and beginning of the continuous length with one another by heat treatment between the moulding plate and the moulding ring and to complete the abutting connection. In this way, the stoppage time of the apparatus for the production of the butting connection can be saved, and during the completion of the butting connection by means of the separate mould plate, the production of the next toothed belt can already be started in the apparatus with another moulding ring.

What is claimed is:

1. A method for the production of an endless reinforced toothed belt from a mouldable material with embedded reinforcing elements extending along the longitudinal direction of the toothed belt comprising placing a reinforcing coil on the exterior of a moulding ring having alternate teeth and depressions, said moulding ring being flexible as regards bending and being substantially elastically non-stretchable in a longitudinal direction, securing the ends of said reinforcing coil to the moulding ring, said moulding ring having a larger circumferential length than the circumference of said moulding wheel such that a portion of said moulding ring is circumferentially spaced from said moulding wheel, forming part of a mould cavity utilizing said moulding ring and a moulding wheel by disposing said moulding ring in a channel in said moulding wheel with the sides of said channel having side flanges forming part of said mould cavity, positioning a cover in contact with the outer periphery of said flanges such that said cover closes said mould cavity, closing a beginning portion of said mould cavity with an injection means by disposing said injection means in sealing engagement with said moulding ring, said flanges and said cover, introducing said moulding material into said beginning portion of said mould cavity by said injection means to mould the beginning of said belt in said beginning portion of said mould cavity, rotating said moulding wheel and advancing said moulding ring, continuing to introduce said moulding material until said beginning of said moulded belt re-enters the beginning portion of said mould cavity, joining said beginning of said moulded belt to the end of said moulded belt by continuing to introduce said mouldable material into the beginning portion of said mould cavity as said beginning of said moulded belt enters said beginning portion of said mould cavity, removing the moulding ring with the formed endless toothed belt from the moulding wheel, and separating the toothed belt from the moulding ring.

2. Method according to claim 1 further comprising blocking mouldable material flow at one of said depressions in said moulding ring by utilizing a lock means, inserting said lock means into one of said depressions of said moulding ring, providing said lock means with grooves which receive said reinforcing elements, said lock means having a radial thickness extending from the depth of said depression in said moulding ring to said cover means, contacting the outer surface of said lock means with said cover means such that said lock means closes off the starting end of said mould cavity, and removing said lock means from the moulding ring by extraction radially outwardly from the moulding ring deprsssion after said lock means has emerged from said mould cavity.

3. Method according to claim 1 comprising initially placing said reinforcing coil on said moulding ring and subsequently placing said moulding ring with said reinforcing coil thereon onto said moulding wheel.

4. Method according to claim 1, wherein said moulding ring comprises a metal band.

5. Method according to claim 4, wherein said metal is steel.

6. Method according to claim 1 further comprising providing a second moulding ring, placing a second reinforcing coil on the exterior of said second moulding ring while said toothed belt is being produced and, upon removing the first said moulding ring with the formed endless toothed belt from the moulding wheel, placing said second moulding ring with said second reinforcing coil thereon onto said moulding wheel to form another toothed belt.

7. Method according to claim 6, wherein said second toothed belt has a circumferential length different from that of the first said toothed belt, whereby various circumferential lengths of toothed belts may be produced using said moulding wheel.

8. A method of producing an endless reinforced toothed belt from material which can be made to flow and then harden, the belt having embedded therein elongate, force-transmission reinforcing elements extending in the longitudinal direction of the belt, in which method a mould cavity is formed between a rotatable moulding wheel having on its circumference an annular depression corresponding to the belt cross-section and a covering which closes the depression over a part of the circumference of the moulding wheel, and the material is flowed into the commencement of the mould cavity for moulding therein, wherein the method includes the steps of providing a toothed moulding ring of band form which can be placed on the moulding wheel, said moulding ring being flexible as regards bending and being substantially elastically non-stretchable in a longitudinal direction, said moulding ring having a larger circumferential length than the circumference of said moulding wheel such that a portion of said moulding ring is circumferentially spaced from said moulding wheel, placing the reinforcing elements on the surface of the moulding ring which contains its toothing, introducing the moulding ring into the moulding wheel depression, closing the moulding wheel depression by application of the covering to the moulding wheel, introducing the material into the mould cavity between the covering and moulding ring, advancing the moulding ring relative to the place of introduction of the material until the circumferential section of the moulding ring carrying the commencement of the formed reinforced continuous length returns to the said place of introduction and the commencement of the continuous moulded length is connected with the end of the continuous length by the introduced material, removing the moulding ring with the formed endless toothed belt from the moulding wheel and separating the toothed belt from the moulding ring.

9. A method according to claim 8, wherein, after the placing of the force-transmission elements on to the moulding ring, a lock is inserted into a tooth gap of the moulding ring, the lock corresponding to the height of the toothed belt profile and extending through the reinforcing elements, and the moulding ring, with the lock lying at the mould cavity commencement, is inserted into the moulding wheel depression, and thereafter the material is introduced at the lock, by which the mould cavity is closed towards its mould cavity end, the lock is removed from the moulding ring and the reinforcing elements by extraction radially outwards from the said moulding ring tooth gap.

10. Apparatus for the production of an endless reinforced toothed belt from a mouldable material with embedded reinforcing elements extending generally along the longitudinal length of the belt, comprising a moulding ring having alternate teeth and depressions, said moulding ring being flexible as regards bending and being substantially elastically non-stretchable in a longitudinal direction, a coil of reinforcing elements disposed about said moulding ring, a moulding wheel having a channel defined by a circumferential surface and two lateral flanges having a diameter greater than the diameter of said circumferential surface, said moulding ring having a diameter greater the diameter of said flanges such that a portion of said moulding ring is circumferentially spaced from said flanges, said moulding ring being disposed within said channel between said two flanges, said alternate teeth and depressions of said moulding ring together with said flanges of said moulding wheel defining part of the mould cavity for the toothed belt being formed, a cover means engaging the outer periphery of said flanges such that said cover means defines another part of said mould cavity, injection means for injecting mouldable material into said mould cavity, said injection means being sealingly in contact with the outer radial ends of said teeth of said moulding ring and sealingly in contact with said cover means so as to provide a closed mould cavity into which said mouldable material is injected, said moulding wheel being rotated to advance said moulding ring one revolution to thereby form a closed loop toothed belt.

11. Apparatus according to claim 10 further comprising lock means disposed in one of said depressions in said moulding ring, said lock means having a radial thickness extending from the depth of said depression in said moulding ring to said cover means such that said cover means contacts the outer radial surface of said lock means, said lock means having recesses opening up to the inner radial surface thereof such that said lock means may be inserted radially inwardly into said depression after said coil member has been previously helically wound on said moulding ring as said recesses receive said coil member.

12. Apparatus according to claim 10 further comprising securing means for securing the ends of said coil of reinforcing elements to the outer radial faces of said teeth of said moulding ring.

13. Apparatus according to claim 10 further comprising means detachably mounting said flanges on said moulding wheel, said detachable mounting providing for accommodating moulding rings of different sizes to thereby mould toothed belts of different sizes.

14. Apparatus according to claim 10, wherein said moulding ring comprises a metal band.

15. Apparatus according to claim 36, wherein said metal is steel.

* * * * *

UNITED STATES PATENT AND TRADEMARK OFFICE
CERTIFICATE OF CORRECTION

PATENT NO. : 4,563,323
DATED : January 7, 1986
INVENTOR(S) : Rudolf BREHER

Figure 1:
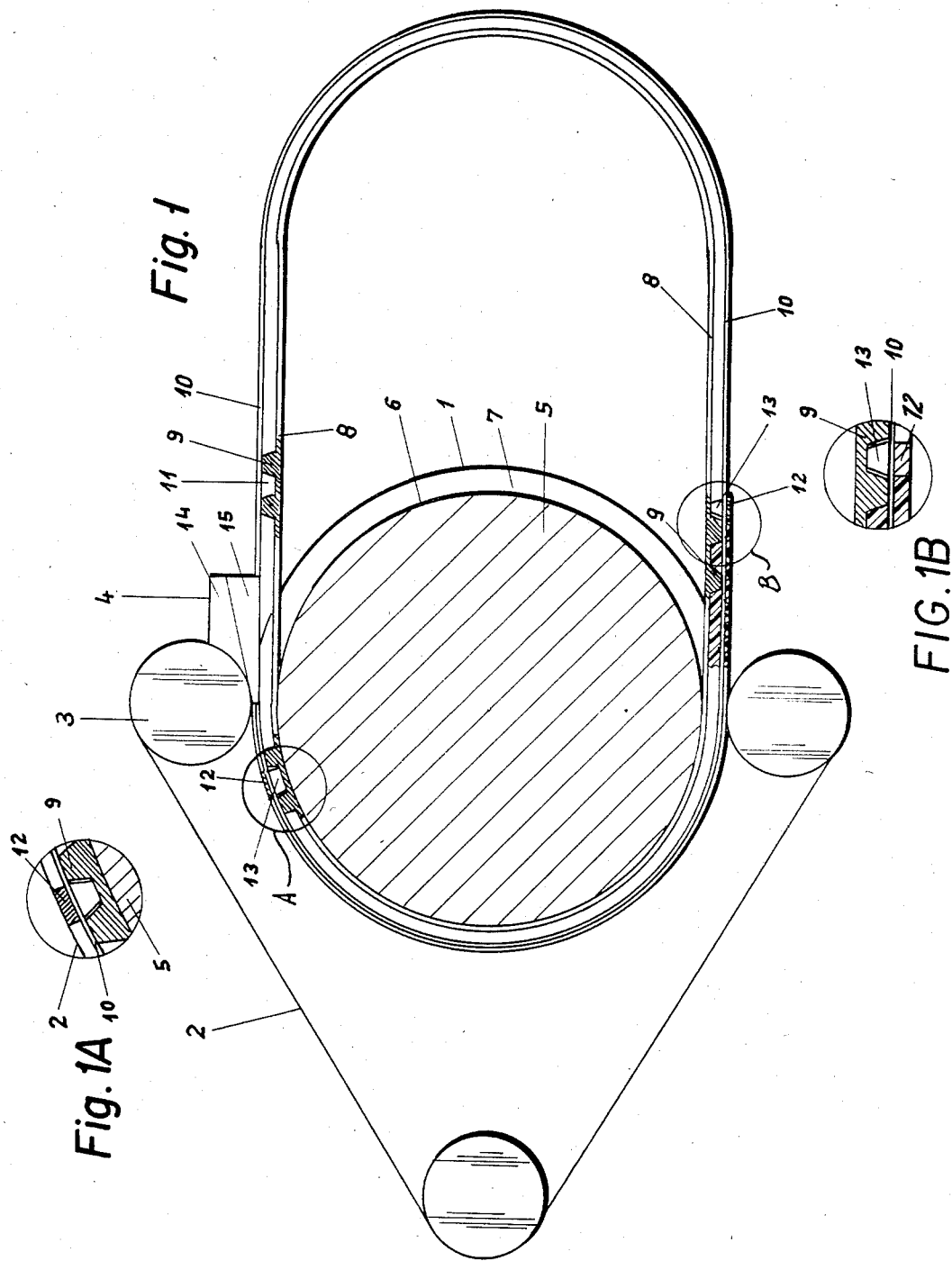
FIG. 1 is an elevational view in schematic form showing an apparatus and method for the production of an endless reinforced toothed belt according to one embodiment of the invention.

It is certified that error appears in the above-identified patent and that said Letters Patent are hereby corrected as shown below:

Column 2, between lines 51 and 52, insert the following:

-- Fig. 1A is a view looking in the area of the circle A in Fig. 1 but on a larger scale.

Fig. 1B is a view looking in the area of the circle B in Fig. 1 but on a larger scale. --.

Column 6, line 22, after "circumference of" change "said" to -- a --;
line 26, after "moulding ring and" change "a" to -- said --.

Signed and Sealed this

First Day of April 1986

[SEAL]

Attest:

DONALD J. QUIGG

Attesting Officer

Commissioner of Patents and Trademarks